United States Patent [19]

Nebelung

[11] Patent Number: 4,592,715
[45] Date of Patent: Jun. 3, 1986

[54] APPARATUS FOR USE IN SHEARING GOBS FROM A VERTICAL COLUMN OF PLASTIC MATERIAL

[75] Inventor: Hermann H. Nebelung, Zurich, Switzerland

[73] Assignee: Emhart Industries, Inc., Farmington, Conn.

[21] Appl. No.: 762,462

[22] Filed: Aug. 5, 1985

[30] Foreign Application Priority Data

Aug. 15, 1984 [GB] United Kingdom ............... 8420714

[51] Int. Cl.$^4$ .................... B29C 17/14; B26D 1/00
[52] U.S. Cl. .................... 425/308; 425/289;
65/332; 83/199; 83/200
[58] Field of Search .............. 425/289, 308; 65/332;
83/199, 200

[56] References Cited

U.S. PATENT DOCUMENTS

| 596,837 | 1/1898 | Werner | 83/199 |
| 3,264,077 | 8/1966 | Bishop | 65/332 X |
| 4,380,423 | 4/1983 | Aoki | 425/289 |
| 4,412,466 | 11/1983 | Jurkowski | 83/200 |
| 4,475,938 | 10/1984 | Knoth | 65/332 X |

Primary Examiner—J. Howard Flint, Jr.
Attorney, Agent, or Firm—H. Samuel Kieser

[57] ABSTRACT

The apparatus comprises two horizontally extending blades (22, 24) mounted for turning movement about a common vertical axis (26). The blades each have a hole (28; 30) therein so arranged that, when the blades are in a first condition, the holes are aligned and a vertical column of plastic material (12) can pass through the holes. Upon the blades being turned about the common vertical axis through a predetermined angle, one clockwise and the other anti-clockwise, edges of the holes (28; 30) pass each other until the holes do not overlap and the column of plastic material passing through the holes is sheared through by edges of the holes.

13 Claims, 6 Drawing Figures

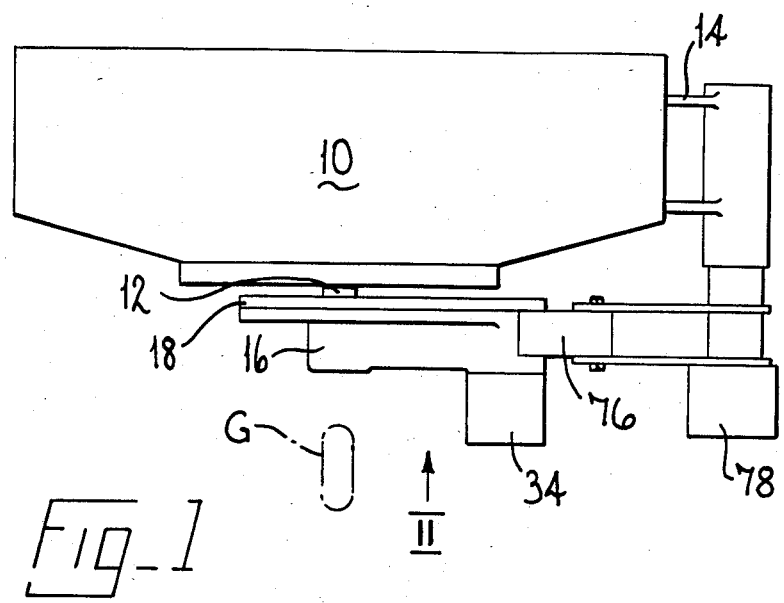
Fig_1
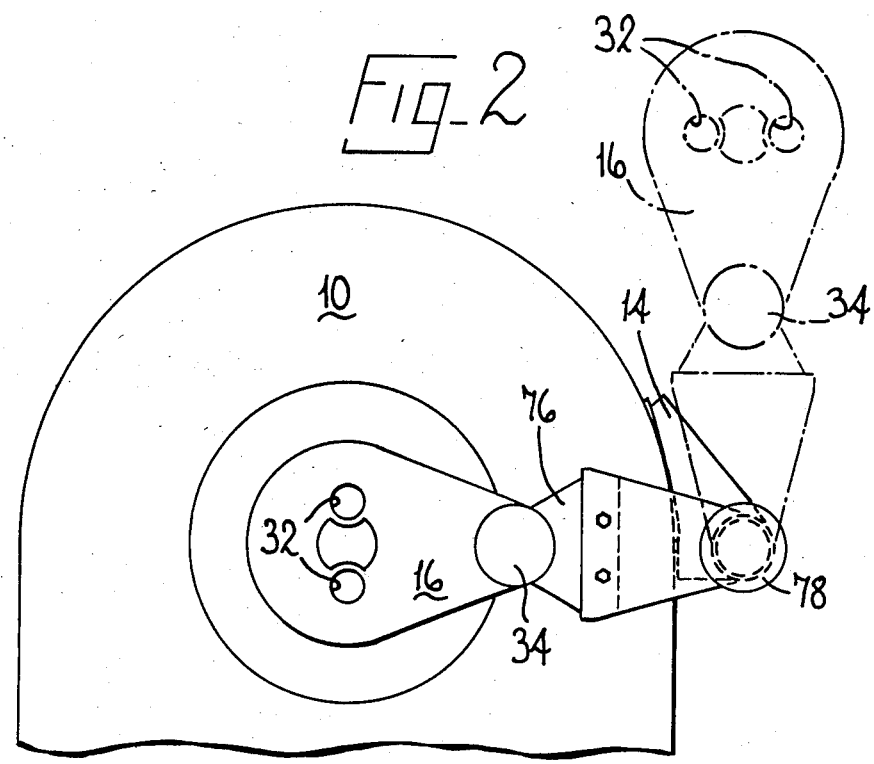
Fig_2

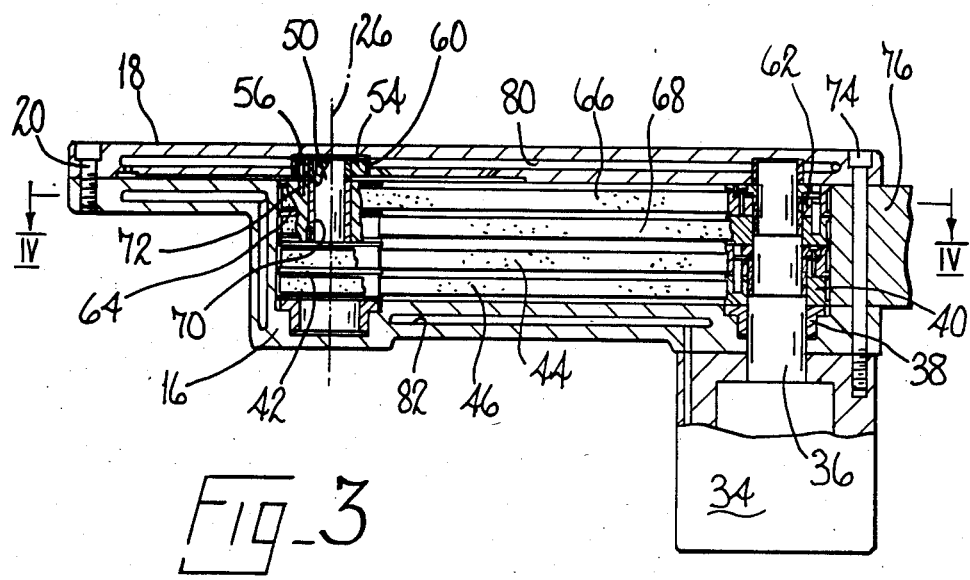
Fig_3
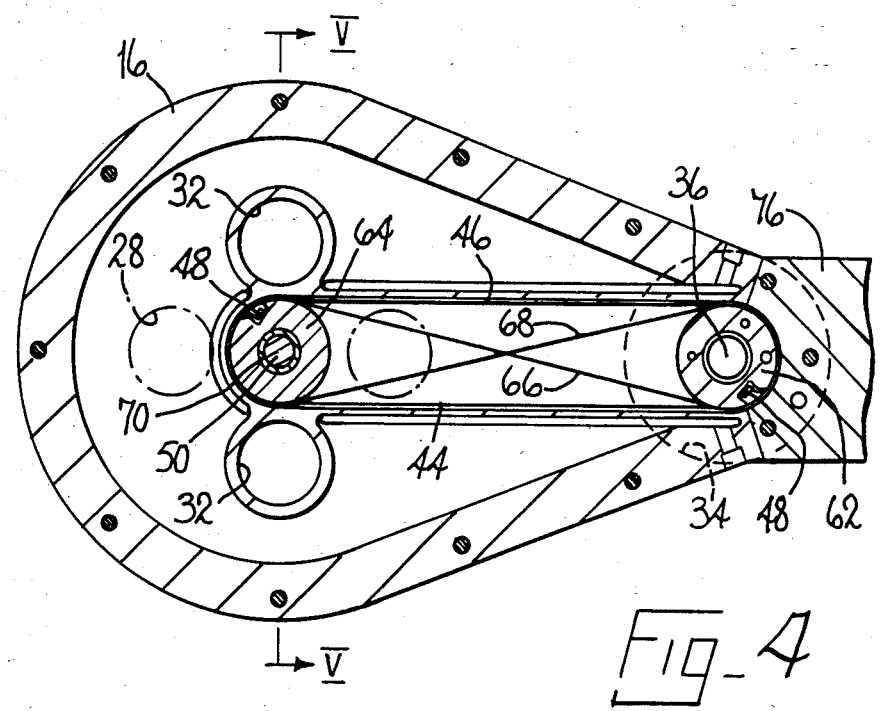
Fig_4

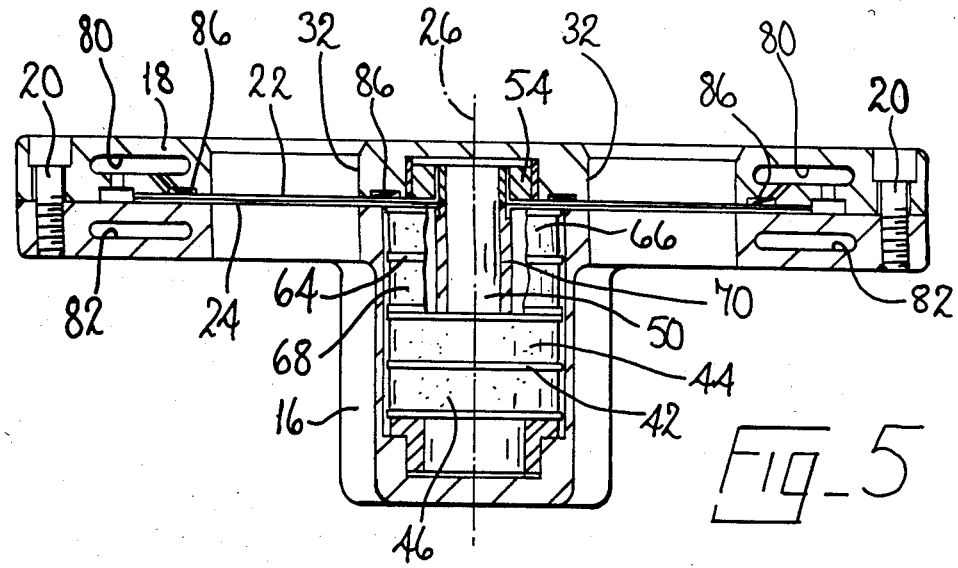
Fig_5
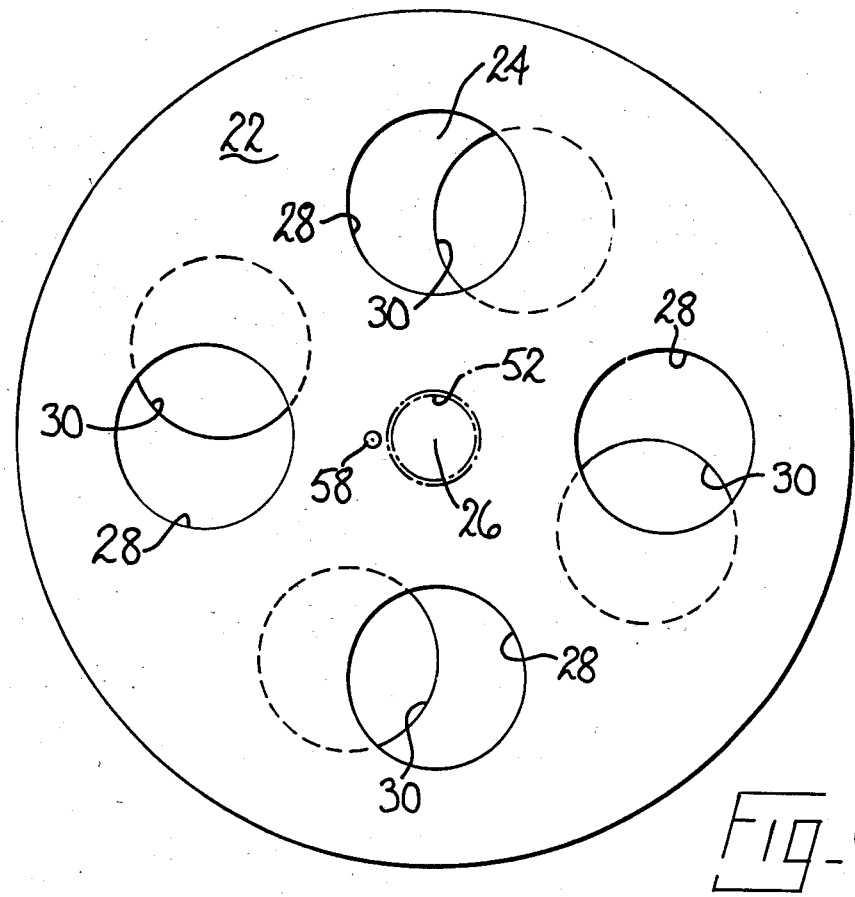
Fig_6

APPARATUS FOR USE IN SHEARING GOBS FROM A VERTICAL COLUMN OF PLASTIC MATERIAL

BACKGROUND OF THE INVENTION

This invention is concerned with an apparatus for use in shearing gobs from a vertical column of plastic material. For example, the apparatus may be used for shearing gobs of molten glass from a vertical column of molten glass issuing from a feeder, each gob being used for making a single article of glassware.

In a conventional apparatus for use in shearing gobs from a vertical column of plastic material, a first shearing blade is mounted on the end of an arm which is turnable about a vertical axis, a second shearing blade is mounted on a second arm for turning movement about the same or a parallel axis, and turning means is used to cause the arms to turn about the axis or axes so as to move the shearing blades between a condition in which one blade is on each side of the vertical column of plastic material and a condition in which the blades are in overlapping relationship having sheared through the vertical column. Conventionally, the turning means comprises a continuously rotating motor which acts on the arms via a cam which causes the arms to make only intermittent movements so that the column of plastic material has time to pass between the shearing blades before a gob is sheared therefrom. Due to inertia and other considerations, the conventional apparatuses are limited in the number of cuts they can achieve in a given time.

It is an object of the present invention to provide an apparatus for use in shearing gobs from a vertical column of plastic material in which higher numbers of gobs can be produced in a given time than by conventional shearing apparatus.

BRIEF SUMMARY OF THE INVENTION

The invention provides an apparatus for use in shearing gobs from a vertical column of plastic material, the apparatus comprising two horizontally-extending blades mounted for turning movement about a common vertical axis, one blade being mounted for sliding movement across the upper surface of the other blade, the blades each having a hole therein so arranged that, when the blades are in a first condition, the holes are aligned and a vertical column of plastic material can pass through the holes, and, upon the blades being turned about the common vertical axis through a predetermined angle, one clockwise and the other anti-clockwise, edges of the holes pass each other until the holes do not overlap and any column of plastic material passing through the holes is sheared through by the edges of the holes, the apparatus also comprising turning means operable to turn the blades about the common vertical axis through the predetermined angle, one clockwise and the other anti-clockwise.

In an apparatus in accordance with the last preceding paragraph, the inertia is less than in conventional shearing apparatus, and a greater number of gobs can be produced in a given time. For example, up to 250 gobs per minute may be produced.

Conveniently, in an apparatus in accordance with the invention, the holes in the blades may be circular, the diameter of the holes being selected to be slightly greater than the diameter of the vertical column of plastic material. However, the shape of the holes may be configured to any particular application.

In a conventional shearing apparatus, it is common practice to mount more than one shearing blade on each of the arms so that more than one vertical column of plastic material can be sheared simultaneously so that several gobs are produced at the same time. In such cases, some of the shearing blades are moved through greater angles than is necessary so that shearing blades located further from the axis or axes may be moved through the required angle. This further reduces the possible number of cuts per minute with conventional apparatus. However, in an apparatus in accordance with the invention, this disadvantage may be overcome by providing that each blade has a plurality of holes disposed at equal distances from the common axis, the holes being so arranged that, when the blades are in their first condition, each of a plurality of vertical columns of plastic material can pass through a hole in one blade and an associated hole in the other blade and, upon the blade being turned about the common axis through the predetermined angle, one clockwise and the other anti-clockwise, all the columns of plastic material are sheared through by edges of the holes through which they pass. Since the holes are located at equal distances from the common axis, all the columns can be sheared through by making the same movement that would be required to shear through a single column.

Conveniently, in an apparatus in accordance with the invention, the predetermined angle may be between 20° and 30°, for example approximately 23°.

Conveniently, in an apparatus in accordance with the invention, the blades may be made of sheet alloy steel having a thickness of approximately 0.5 millimeters, e.g. between 0.3 and 0.7 millimeters.

To enable a single motor to be used to turn the blades in opposite directions about the common vertical axis, the turning means may comprise a rotary drive motor operable to turn an output shaft, the output shaft being connected to the blades by connecting means which causes the blades to turn in opposite directions about the common vertical axis when the shaft turns in one direction.

In order to provide a connecting means which is reliable, has little backlash, and low inertia, the connecting means may comprise a first pair of pulleys comprising a first pulley fixed to the output shaft and a second pulley fixed to a first of the blades, two belts connecting the pulleys of the first pair, each of the belts having an end portion secured to the first pulley and an opposite end portion secured to the second pulley, a first of the belts passing clockwise around a portion of the circumference of the first pulley, extending between the first and the second pulleys tangentially thereto, and passing clockwise around a portion of the circumference of the second pulley, the second belt passing anti-clockwise around a portion of the circumference of the first pulley, extending between the first and the second pulleys parallel to the first belt, and passing anti-clockwise around a portion of the circumference of the second belt, the first and the second belt having substantially equal tensions so that, when the first pulley is turned, the belts transmit an equal turn to the second pulley, a second pair of pulleys comprising a first pulley fixed to the output shaft and a second pulley fixed to a second of the blades, and two further belts connecting the pulleys of the second pair, each of the further belts having an end portion fixed to the first pulley of the second pair and an opposite end portion fixed to the second pulley thereof, a first of the further belts passing clockwise around a portion of the circumference of the first pulley of the second pair, extending between the pulleys of the second pair tangentially thereto, and passing anti-clockwise around a portion of the circumference of the second pulley of the second pair, the second of the further belts passing anti-clockwise around a portion of the circumference of the first pulley of the second pair, extending between the pulleys of the second pair crossing above or below the first further belt, and passing clockwise around a portion of the circumference of the second pulley of the second pair, the first and the second further belts having substantially equal tensions so that, when the first pulley of the second pair is turned, the further belts transmit an equal turn but in the opposite direction to the second pulley of the second pair.

In an apparatus in accordance with the last preceding paragraph, the second pulley of each pair of pulleys may be positioned below the blades, a lower of these pulleys being fixed to a shaft which extends along the common axis of the blades through aligned holes in the blades, the shaft being fixed to a bush which is fixed to an upper surface of the upper blade so that turning the lower pulley causes the shaft and the upper blade to turn, an upper of the pulleys being fixed to a cylindrical bush which is turnably received on said shaft, the cylindrical bush being fixed to a lower surface of the lower blade so that turning the upper pulley causes the cylindrical bush and the lower blade to turn.

In conventional shearing apparatus, the apparatus is fixed so that the blades are beneath a feeder which supplies the columns of plastic material. Thus, when it is necessary to replace the shearing blades or to carry out maintenance on the apparatus, it is necessary to partially dismantle the apparatus in order to remove it from the vicinity of the feeder. In order to overcome this disadvantage, in an apparatus in accordance with the invention, the blades and the turning means may be mounted on a housing which is mounted for pivotal movement about a vertical axis between an operative position, in which the blades are beneath a feeder and a vertical column of plastic material supplied by the feeder can pass through the holes in the blades, and an out-of-the-way position in which the blades are not beneath the feeder. Thus, the apparatus can readily be turned about the vertical axis when maintenance and/or replacement is necessary. Conveniently, a rotary drive motor is operable to turn the housing through a predetermined angle between its operative and out-of-the-way positions.

In conventional shearing apparatus, the shearing blades are periodically sprayed with lubricant. This means that a considerable quantity of lubricant is wasted because it misses the shearing blades during the spraying process. In order to avoid this disadvantage, in an apparatus in accordance with the invention, the blades and the turning means may be mounted on a housing which defines passages through which cooling and/or lubricating fluid for the blades passes. Thus, the supply of lubricating fluid can be contained within the housing preventing wastage of lubricating fluid and cooling can be provided.

In order to increase the shearing efficiency of an apparatus in accordance with the invention and also to reduce shearing marks on the completed glassware, the blades and the turning means may be mounted on a housing which has one or more holes therethrough to receive one or more vertical columns of plastic material, a spring-loaded scraper ring for each hole being mounted on the housing so that it surrounds the hole and presses the blades together around the hole. The scraper ring or scraper rings, thus, acts to reduce the gap between the blades to a minimum in the vicinity of the shearing.

BRIEF DESCRIPTION OF THE DRAWINGS

There now follows a detailed description, to be read with reference to the accompanying drawings, of an apparatus for use in shearing gobs from a vertical column of plastic material which is illustrative of the invention. It is to be understood that the illustrative apparatus has been selected for description by way of example and not of limitation of the invention.

In the drawings

FIG. 1 is a front elevational view of the illustrative apparatus showing it mounted on a feeder which can produce two vertical columns of molten glass;

FIG. 2 is a view taken in the direction of the arrow II in FIG. 1;

FIG. 3 is a vertical cross-sectional view, on a larger scale than FIGS. 1 and 2, taken through a portion of the illustrative apparatus;

FIG. 4 is a cross-sectional view taken on the line IV—IV in FIG. 3;

FIG. 5 is a vertical cross-sectional view taken on the line V—V in FIG. 4, on a larger scale than FIG. 4; and FIG. 6 is a plan view of the blades of the illustrative apparatus.

DETAILED DESCRIPTION OF PREFERRED EMBODIMENT OF THE INVENTION

The illustrative apparatus is for use in shearing gobs G of molten glass from a vertical column of molten glass issuing from a feeder 10 (see FIG. 1). The feeder 10 produces two vertical columns of molten glass 12 (only one visible in FIG. 1) and the illustrative apparatus is mounted on a bracket 14 on the side of the feeder 10 which is of conventional construction.

The illustrative apparatus comprises a housing comprising a lower portion 16 and a lid 18 bolted to the lower portion 16 by bolts 20 (see FIG. 3). Within the housing 16, 18, two horizontally-extending blades, an upper blade 22 and a lower blade 24, are mounted for turning movement about a common vertical axis 26. The blades 22 and 24 (see FIG. 6) are both made of sheet steel having a thickness of 0.5 mm, and are circular when viewed in plan. The axis 26 passes vertically through the centre of each blade 22 and 24. The upper blade 22 is mounted directly above the lower blade 24 for sliding movement across the upper surface of the lower blade 24. The blade 22 has four circular holes 28 therein (see FIG. 6) and the blade 24 has four circular holes 30 therein which are of the same diameter as the holes 28. The holes 28 are uniformly distributed about the axis 26 as are the holes 30. The holes 28 and 30 are all at the same distance from the axis 26. The holes 28 and 30 are so arranged that, when the blades 22 and 24 are in a first condition thereof, the holes 28 are each aligned with a hole 30 and a vertical column of molten glass can pass through the holes 28 and 30, and, upon the blades 22 and 24 being turned about the common vertical axis 26 through a predetermined angle of approximately 23 degrees, the blade 22 being turned clockwise and the blade 24 being turned anti-clockwise, edges of the holes 28 and 30 pass each other until the holes do not overlap and any column of molten glass passing through the holes 28 and 30 is sheared through by edges of the holes. In FIG. 6, the blades 22 and 24 are shown in an intermediate position during their movement. Both the blades 22 and 24 have turned through equal angles in opposite directions about the axis 26 and the holes 28 and 30 have passed from alignment to a partially-overlapping condition on their way to complete lack of overlap.

Although the blades 22 and 24 each have four holes 28 or 30, only two of the holes 28 and two of the holes 30 are used in the illustrative apparatus for shearing gobs from vertical columns of molten glass issuing from the feeder 10. The housing 16, 18 has two cylindrical holes 32 passing vertically therethrough through which vertical columns of molten glass 12 can pass. The holes 32 are arranged on opposite sides of the axis 26 and at the same distance from the axis 26 as the holes 28 and 30 in the blades 22 and 24. When the blades 22 and 24 are in their first condition, each hole 32 is aligned with one of the holes 28 and one of the holes 30 so that a vertical column of molten glass can pass through the hole 32 passing through one of the holes 28 and one of the holes 30. Turning of the blades 22 and 24 about the axis 26 as aforementioned shears the columns of molten glass 12 in the holes 32 so that two gobs G are produced simultaneously. The unused holes 28 and 30 in the blades 22 and 24 are provided so that the blades 22 and 24 may be turned through 90° when they become worn to bring the unused pair of holes 28 and 30 into use in substitution for the previously used pair of holes 28 and 30.

The illustrative apparatus also comprises turning means operable to turn the blades 22 and 24 about the common vertical axis 26 through the predetermined angle, one clockwise and the other anti-clockwise. The turning means comprises a hydraulic rotary drive motor 34 mounted on the underside of the lower housing portion 16 and operable to turn an output shaft 36. The output shaft 36 passes through a hole into the interior of the housing 16, 18, a bearing 38 being provided in the hole. The output shaft 36 is connected to the blades 22 and 24 by connecting means which causes the blades 22 and 24 to turn in opposite directions about the axis 26 when the output shaft 36 turns in one direction. The connecting means comprises a first pair of pulleys comprising a first pulley 40 fixed to the output shaft 36 and a second pulley 42 fixed to the upper blade 22. The pulleys 40 and 42 are of the same diameter and each is constructed with an upper and a lower portion which can be turned relative to each other and then clamped together so that the portions move as a unit. The connecting means also comprises two steel belts connecting the pulleys 40 and 42. The belts are made of steel having a thickness of 0.3 mm to 0.5 mm and comprise an upper belt 44 and a lower belt 46. Each of the belts 44 and 46 has an end portion secured to the pulley 40 and an opposite end portion secured to the pulley 42. The end portions of the belts 44 and 46 are received in recesses 48 (see FIG. 4) in the surface of the pulleys 40 and 42 and are clamped therein. The belt 44 passes clockwise around a portion of the circumference of the pulley 40 from its point of attachment thereto, extends between the pulleys 40 and 42 tangentially thereto, and passes clockwise around a portion of the circumference of the pulley 42 to its point of attachment thereto. The belt 44 is attached to the upper portions of the pulleys 40 and 42. The belt 46 passes anti-clockwise around a portion of the circumference of the pulley 40, extends between the pulleys 40 and 42 parallel to the first belt 44, and passes anti-clockwise around a portion of the circumference of the pulley 42 to its point of attachment thereto. During a setting up operation, the portions of the pulleys 40 and 42 are turned relative to one another so that the first and the second belts 44 and 46 are brought to substantially equal tensions and the portions of the pulleys 40 and 42 are then clamped together to maintain this substantially equal tension. Thus, when the first pulley 40 is turned by turning of the shaft 36, the belts 44 and 46 transmit an equal turn to the pulley 42. The pulley 42 is mounted on the housing portion 16 within the housing on a shaft 50 which extends along the vertical axis 26. The shaft 50 extends through central holes 52 in the blades 22 and 24 and is attached to a bush 54 above the blade 22. The bush 54 extends above the blade 22 and is secured thereto. A pin 56 mounted on the bush 54 enters a hole 58 in the upper blade 22 to ensure that the blade 22 turns with the bush 54. A bearing 60 on the lid 18 guides the bush 54 in its rotation. Thus, when the pulley 42 is turned about the axis 26, the shaft 50, the bush 54, and the blade 22 also turn about the axis 26.

The connecting means also comprises a second pair of pulleys comprising a first pulley 62 fixed to the output shaft 36 of the motor 34 above the pulley 40 and a second pulley 64 fixed to the lower blade 24. The pulleys 62 and 64 are similar in construction to the pulleys 40 and 42, having relatively movable and clampable portions. The connecting means also comprises two further belts 66 and 68 connecting the pulleys 62 and 64. The further belts 66 and 68 are similar in construction to the belts 44 and 46. Each of the belts 66 and 68 has an end portion fixed to the pulley 62 and an opposite end portion fixed to the pulley 64. The belt 66 passes clockwise around a portion of the circumference of the pulley 62 from its point of attachment thereto, extends between the pulleys 62 and 64 tangentially thereto, and passes anti-clockwise around a portion of the circumference of the pulley 64 to its point of attachment thereto. The belt 68 passes anti-clockwise around a portion of the circumference of the first pulley 62, extends between the pulleys 62 and 64 crossing below the belt 66, and passes clockwise around a portion of the circumference of the pulley 64 to its point of attachment thereto. It should be noted that while the belts 44 and 46 extend parallel to one another, the belts 66 and 68 cross above or below one another (see FIG. 4). The belts 66 and 68 are of substantially equal tensions so that, when the pulley 62 is turned by turning the shaft 36 the belts 66 and 68 transmit an equal turn but in the opposite direction to the pulley 64. The pulley 64 is mounted above the pulley 42, both pulleys 42 and 64 being beneath the blades 22 and 24. The pulley 64 is fixed to a cylindrical bush 70 which is turnably received on the shaft 50. The bush 70 is fixed to the lower surface of the lower blade 24 so that turning the pulley 64 causes the cylindrical bush 70 and the lower blade 24 to turn. A pin 72 from the pulley 64 projects into a hole in the blade 24 (not shown but similar to the hole 58 in the blade 22) to ensure that the blade 24 turns with the pulley 64.

The housing 16, 18 is secured by bolts 74 to an arm 76 which is fixed to the housing of a rotary drive motor 78. The rotary drive motor 78 has an output shaft (not shown) fixed to the bracket 14. Operation of the motor 78 causes the housing thereof and the arm 76 to turn about a vertical axis passing along the output shaft of the motor 78 through the bracket. Thus, the blades 22 and 24 and the turning means therefor are mounted on a housing 16, 18 which is mounted for pivotal movement about a vertical axis by operation of the motor 78. The housing 16, 18 is pivotal between an operative position (shown in full line in FIG. 2) in which the blades 22 and 24 are beneath the feeder 10 and vertical columns of molten glass supplied by the feeder 10 can be pass through the holes 28 and 30 in the blades, and an out-of-the-way position (shown in broken line in FIG. 2) in which the blades 22 and 24 are not beneath the feeder. The motor 78 is operable to turn the housing 16, 18 through a predetermined angle between its operative and out-of-the-way positions. Thus, when maintenance and/or replacement of part of the illustrative apparatus is required, the motor 78 is operated to turn the illustrative apparatus to its out-of-the-way position clear of the feeder so that the maintenance and/or replacement can be carried out in safety. When the maintenance and/or replacement has been carried out, the motor 78 is operated in the opposite direction to bring the illustrative apparatus back to its operative position.

The housing 16, 18 also defines passages 80 (see FIG. 5 and FIG. 3) through which lubricating fluid passes to the blades 22 and 24. Thus, the lubricating fluid is contained in the passages so that none is wasted. The housing 16, 18 also defines cooling passages 82 through which cooling fluid can be circulated through the housing to prevent overheating of the bearings and/or motors.

The housing 16, 18 also contains two scraper rings 86 which are mounted on the lid 18. Each scraper ring is spring loaded downwards and surrounds one of the holes 32 so that it presses the blades 22 and 24 together around the hole 32.

In the illustrative apparatus, a plurality of vertical columns of molten glass can pass through holes in the blades 22 and 24. Each column 12 passes through a hole in the blade 22 and an associated hole in the blade 24 and, upon the blades being turned about the common axis 26 through the predetermined angle, one clockwise and the other anti-clockwise, both the columns 12 are sheared through by edges of the holes through which they pass. The illustrative apparatus has low inertia and can make up to 250 cuts per minute.

I claim:

1. Apparatus for use in shearing gobs from a vertical column of plastic material, the apparatus comprising two horizontally-extending blades mounted for turning movement about a common vertical axis, one blade being mounted for sliding movement across the upper surface of the other blade, the blades each having a hole therein so arranged that, when the blades are in a first condition, the holes are aligned and a vertical column of plastic material can pass through the holes, and, upon the blades being turned about the common vertical axis through a predetermined angle, one clockwise and the other anti-clockwise, edges of the holes pass each other until the holes do not overlap and any column of plastic material passing through the holes is sheared through by edges of the holes, the apparatus also comprising turning means on said apparatus operable to turn the blades about the common vertical axis through the predetermined angle, one clockwise and the other anti-clockwise, said turning means comprises a rotary drive motor operable to turn an output shaft, the output shaft being connected to the blades by connecting means which causes the blades to turn in opposite directions about the common vertical axis when the shaft turns in one direction.

2. Apparatus according to claim 1, wherein the holes in the blades are circular.

3. Apparatus according to claim 1, wherein the predetermined angle is between 20° and 30°.

4. Apparatus according to claim 1, wherein each blade has a plurality of holes disposed at equal distances from the common axis, the holes being so arranged that, when the blades are in their first condition, each of a plurality of vertical columns of plastic material can pass through a hole in one blade and an associated hole in the other blade and, upon the blades being turned about the common axis through the predetermined angle, one clockwise and the other anti-clockwise, all the columns of plastic material are sheared through by edges of holes through which they pass.

5. Apparatus according to claim 4, wherein the holes in the blades are circular.

6. Apparatus according to claim 4, wherein the predetermined angle is between 20° and 30°.

7. Apparatus according to claim 1, wherein the blades are made of sheet steel having a thickness of between 0.3 and 0.7 mm.

8. Apparatus according to claim 1, wherein the connecting means comprises a first pair of pulleys comprising a first pulley fixed to the output shaft and a second pulley fixed to a first of the blades, two belts connecting the pulleys of the first pair, each of the belts having an end portion secured to the first pulley and an opposite end portion secured to the second pulley, a first of the belts passing clockwise around a portion of the circumference of the first pulley, extending between the first and the second pulleys tangentially thereto, and passing clockwise around a portion of the circumference of the second pulley, the second belt passing anti-clockwise around a portion of the circumference of the first pulley, extending between the first and the second pulleys parallel to the first belt, and passing anti-clockwise around a portion of the circumference of the second pulley, the first and the second belts having substantially equal tensions so that, when the first pulley is turned, the belts transmit an equal turn to the second pulley, a second pair of pulleys comprising a first pulley fixed to the output shaft and a second pulley fixed to a second of the blades, and two further belts connecting the pulleys of the second pair, each of the further belts having an end portion fixed to the first pulley of the second pair and an opposite end portion fixed to the second pulley thereof, a first of the further belts passing clockwise around a portion of the circumference of the first pulley of the second pair, extending between the pulleys of the second pair tangentially thereto, and passing anti-clockwise around a portion of the circumference of the second pulley of the second pair, the second of the further belts passing anti-clockwise around a portion of the circumference of the first pulley of the second pair, extending between the pulleys of the second pair crossing above or below the first further belt, and passing clockwise around a portion of the circumference of the second pulley of the second pair, the first and the second belts having substantially equal tensions so that, when the first pulley of the second pair is turned the further belts transmit an equal turn but in the opposite direction to the second pulley of the second pair.

9. Apparatus according to claim 8, wherein the second pulleys of each pair of pulleys is positioned below the blades, a lower of these pulleys being fixed to a shaft which extends along the common axis of the blades through aligned holes in the blades, the shaft being fixed to a bush which is fixed to an upper surface of the upper blade so that turning the lower pulley causes the shaft and the upper blade to turn, an upper of the pulleys being fixed to a cylindrical bush which is turnably received on said shaft, the cylindrical bush being fixed to a lower surface of the lower blade so that turning the upper pulley causes the cylindrical bush and the lower blade to turn.

10. Apparatus according to claim 1, wherein the blades and the turning means are mounted on a housing which is mounted for pivotal movement about a vertical axis between an operative position in which the blades are beneath a feeder and a vertical column of plastic material supplied by the feeder can pass through the holes in the blades, and an out-of-the-way position in which the blades are not beneath the feeder.

11. Apparatus according to claim 9, wherein a rotary drive motor is operable to turn the housing through a predetermined angle between its operative and out-of-the-way positions.

12. Apparatus according to claim 1, wherein the blades and the turning means are mounted on a housing which defines passages through which cooling and/or lubricating fluid for the blades passes.

13. Apparatus according to claim 1, wherein the blades and the turning means are mounted on a housing which has one or more holes therethrough to receive one or more vertical columns of plastic material, a spring-loaded scraper ring for each hole being mounted on the housing so that it surrounds the hole and presses the blades together around the hole.

* * * * *